United States Patent
Neuteboom et al.

(10) Patent No.: US 11,198,746 B2
(45) Date of Patent: Dec. 14, 2021

(54) ETHYLENE COPOLYMERS AND PROCESS FOR THE PRODUCTION THEREOF

(71) Applicant: SABIC GLOBAL TECHNOLOGIES B.V., Bergen op Zoom (NL)

(72) Inventors: Peter Neuteboom, Hoensbroek (NL); Diego Mauricio Castaneda Zuniga, Maastricht (NL); Jan Nicolaas Eddy Duchateau, Paal (BE); Franciscus Petrus Hermanus Schreurs, Maastricht (NL); Jerome Vachon, Geleen (NL); Carolina De Los Angeles Toloza Porras, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/766,018

(22) PCT Filed: Nov. 19, 2018

(86) PCT No.: PCT/EP2018/081796
§ 371 (c)(1),
(2) Date: May 21, 2020

(87) PCT Pub. No.: WO2019/101693
PCT Pub. Date: May 31, 2019

(65) Prior Publication Data
US 2020/0354491 A1 Nov. 12, 2020

(30) Foreign Application Priority Data
Nov. 24, 2017 (EP) .................................... 17203593

(51) Int. Cl.
*C08F 210/02* (2006.01)
*C08F 210/16* (2006.01)
*C08F 210/14* (2006.01)

(52) U.S. Cl.
CPC .......... *C08F 210/02* (2013.01); *C08F 210/14* (2013.01); *C08F 210/16* (2013.01); *C08F 2800/10* (2013.01)

(58) Field of Classification Search
None
See application file for complete search history.

(56) References Cited

U.S. PATENT DOCUMENTS 3,510,448 A * 5/1970 Anspon .................... C08L 23/08
524/562
4,351,931 A 9/1982 Armitage

FOREIGN PATENT DOCUMENTS

WO 2005017014 A1 2/2005

OTHER PUBLICATIONS

International Serach Report for International Application No. PCT/EP2018/081796, International Filing Date Nov. 19, 2018, dated Jan. 18, 2019, 4 pages.
Written Opinion for International Application No. PCT/EP2018/081796, International Filing Date Nov. 19, 2018, dated Jan. 18, 2019, 5 pages.

* cited by examiner

*Primary Examiner* — Richard A Huhn
(74) *Attorney, Agent, or Firm* — Cantor Colburn LLP

(57) ABSTRACT

The present invention relates to an ethylene copolymer obtained by radical polymerisation through a high-pressure process comprising (i) ≥78.0 and ≤99.99 mole % of recurring units derived from ethylene; (it) ≥0.01 and ≤22.0 mole % of recurring units derived from comonomer A according to Formula (I), wherein R1 is composed of a saturated aliphatic moiety comprising 5-40 carbon atoms or R1 is composed of a saturated aliphatic moiety and consists of hydrogen atoms and 5-40 carbon atoms; R2 is selected from —H or —CH₃; R3 is selected from —O—, —(CO)—(NH)— or —(CO)—O—; n=0 or 1 The ethylene copolymers have a reduced peak melting temperature and reduced enthalpy of fusion, indicating that these ethylene copolymers have a reduced degree of crystallinity and improved clarity, combined with a desired melt mass-flow rate.

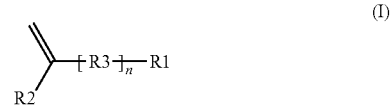

(I)

18 Claims, No Drawings

ETHYLENE COPOLYMERS AND PROCESS FOR THE PRODUCTION THEREOF

CROSS REFERENCE TO RELATED APPLICATIONS

This application is a National Stage application of PCT/EP2018/081796, filed Nov. 19, 2018, which claims the benefit of European Application No. 17203593.3, filed Nov. 24, 2017, both of which are incorporated by reference in their entirety herein.

The present invention relates to ethylene copolymers. The invention further relates to a process for the production of such ethylene copolymers in a tubular reactor.

Ethylene copolymers are materials that offer a spectrum of material properties rendering them suitable for a wide variety of applications. Such applications include films, foams, adhesive solutions, wire & cable coatings, and coating films.

In film applications, the ethylene copolymers may be used to form single-layer films or to form one or more layers of multi-layer films. Ethylene copolymers may be used in several layers of such multi-layer films, such as for example as intermediate layers, where the ethylene copolymer amongst others has an adhesive function to bind the layers on either side, or as surface layers. In such applications, it is desirable that the materials of which the layers are produced may be thermally welded and have high transparency.

A further field of application where ethylene copolymers find their use is in coating films, also referred to as extrusion coatings. In such extrusion coating processes, a coating of ethylene copolymer may be formed onto a substrate material by applying a quantity of molten ethylene copolymer onto one or more of the surface layers of the substrate material by means of melt extrusion of the ethylene copolymer onto the substrate surface. Suitable substrate materials that may be subjected to extrusion coating with ethylene copolymers include paper, paperboard, metal foils such as aluminium foils, and polymeric films.

To be suitable for use in such applications, ethylene copolymers need to provide a certain combination of properties. It is in particular desirable for use in such applications that ethylene copolymers have a low melting temperature. A low melting temperature allows for processing at comparatively low processing temperatures, which results in energy saving during the processing of the ethylene copolymers.

Furthermore, it is desirable that the ethylene copolymers have a low degree of crystallinity. A low degree of crystallinity is understood to contribute to amongst others good optical properties and surface properties. An optical property that is particularly relevant is clarity. Having high clarity is in many applications desirable as it allows for applying the ethylene copolymers in applications where transparency of the polymer layer is required.

A property that is particularly relevant is the melting temperature. Ethylene copolymers that have a low melting temperature have low sealing temperatures. Low sealing temperatures are particularly desirable for extrusion coating applications, film applications and in adhesive solutions.

There is a clear need for ethylene copolymers that provide a balance of a low melting temperature, a low degree of crystallinity and good sealing properties at a sufficiently low melt mass-flow rate. Sufficiently low melt-mass flow rates are important for the manufacture of films, foams, adhesive solutions, wire & cable coatings, seal layers and extrusion coatings.

In addition, it is desirable that the amount of comonomer that needs to be dosed to the reactor is as low as possible to achieve the desired properties such as a low melting temperature and a low degree of crystallinity. Low amounts of comonomer result in a higher ceiling temperature and allow applying higher reactor temperatures. This leads to a higher conversion of the monomers and makes the process more efficient. The ceiling temperature for high pressure copolymerizations is to be understood as the temperature at which the net rate of polymer chain growth is zero.

Furthermore, a lower amount of comonomer dosage and a higher conversion of monomers lead to less unreacted residues of comonomer in the copolymer, which avoids the necessity for work-up of the copolymer to remove unreacted residues of the comonomer from the copolymer. This makes the process simpler, since no additional equipment is needed. Lower amounts of comonomer and a simpler process have as well a beneficial economic and environmental impact.

Surprisingly it was found that certain comomoners lower the melting temperature and the degree of crystallinity already at low amounts of incorporation which means that the amount of comonomer added to the reactor can be kept a low level.

The invention is characterised by an ethylene copolymer obtained by radical polymerisation through a high-pressure process comprising:
  (i) ≥78.0 and ≤99.99 mole % of recurring units derived from ethylene;
  (ii) ≥0.01 and ≤22.0 mole % of recurring units derived from comonomer A according to Formula (I):

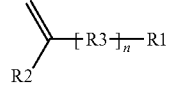

Formula (I)

wherein
R1 is composed of an aromatic and/or saturated aliphatic moiety comprising 5-40 carbon atoms or R1 is composed of an aromatic and/or saturated aliphatic moiety and consists of hydrogen atoms and 5-40 carbon atoms;
R2 is selected from —H or —CH$_3$;
R3 is selected from —O—, —(CO)—(NH)— or —(CO)—O—;
n=0 or 1
R1 is composed of an aromatic and/or saturated aliphatic moiety comprising 5-40 carbon atoms. The moiety may be composed of either one or more aromatic groups or one or more saturated aliphatic groups or the moiety may be composed of a combination of one or more aromatic and one or more saturated aliphatic groups.

Preferably, the moiety is composed of or more saturated aliphatic groups. This has an advantage that the ethylene copolymer of the invention is more suitable for food packaging and is easier to recycle.

Preferably, R1 in Formula (I) is composed of an aromatic and/or saturated aliphatic moiety and consists of hydrogen atoms and 5-40 carbon atoms.

Preferably R1 in Formula (I) is composed of an aromatic and/or saturated aliphatic moiety comprising 5-20 carbon atoms.

Preferably, R1 in Formula (I) is composed of an aromatic and/or saturated aliphatic moiety and consists of hydrogen atoms and 5-20 carbon atoms.

According to a further preferred embodiment of the invention R1 in Formula (I) is a composed of an aromatic and/or saturated aliphatic moiety comprising 5-12 carbon atoms.

Preferably, R1 in Formula (I) is composed of an aromatic and/or saturated aliphatic moiety and consists of hydrogen atoms and 5-12 carbon atoms.

Preferably, n in Formula (I) is 1.

Preferably, R1 in Formula (I) is composed of an aromatic and/or saturated aliphatic moiety and consists of hydrogen atoms and 5-12 carbon atoms and n in Formula (I) is 1.

The functional groups of R3, —(CO)—(NH)— or —(CO)—O—, may be understood to be incorporated in such a way that the comonomer A yields in a methacrylate or acrylate or methacrylamide or an acrylamide.

The ethylene copolymers according to the invention have a low melting temperature, a low crystallinity and good adhesive properties, combined with a low melt-mass flow rate.

In the present context, the enthalpy of fusion is used as indicator for crystallinity; a reduction of the enthalpy of fusion is to be understood to reflect a reduction of the degree of crystallinity.

The ethylene copolymer according to the present invention may for example comprise $\geq 0.01$ and $\leq 22.0$ mole %, preferably $\geq 0.05$ and $\leq 10.0$ mole %, more preferably $\geq 0.1$ and $\leq 5.0$ mole % of recurring units derived from comonomer A.

Furthermore, it is particularly desirable that the ethylene copolymers have good melt processability, indicated by for example a sufficiently low melt mass-flow rate. This can for example be controlled by temperature. However, this may lead to a reduction of throughput and decreased plant output. Therefore, other parameters are more suitable. A sufficiently low melt mass flow rate may be achieved by addition of small amounts a second comonomer B. According to a preferred embodiment of the invention the ethylene copolymer comprises in addition to comonomer A.

(i) $\geq 0$ and $\leq 2.00$ mole % or $>0$ and $\leq 2.00$ mole % of recurring units derived from comonomer B according to Formula (II):

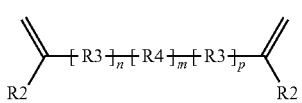

Formula (II)

wherein
R4 is a moiety comprising 1-30 carbon atoms;
each of R2 is individually selected from —H or —CH$_3$;
each of R3 is individually selected from —O—, —(CO)—(NH)— or —(CO)—O—;
n=0 or 1;
p=0 or 1; and
m$\geq$1 and $\leq$10;

Preferably R4 in Formula (II) may composed of an aromatic and/or saturated aliphatic moiety comprising 1-30 carbon atoms. This means that the moiety may be composed of either an aromatic structure or an aliphatic structure or the moiety is composed of a combination of aromatic and saturated aliphatic groups.

Preferably, R4 in Formula (II) may composed of an aromatic and/or saturated aliphatic moiety consisting of hydrogen atoms and 1-30 carbon atoms.

More preferably R4 in Formula (II) may be composed of an aromatic and/or saturated aliphatic moiety comprising 1-20 carbon atoms.

More preferably R4 in Formula (II) may be composed of an aromatic and/or saturated aliphatic moiety consisting of hydrogen atoms and 1-20 carbon atoms.

More preferably R4 in Formula (II) may be composed of an aromatic and/or saturated aliphatic moiety comprising 1-10 carbon atoms.

More preferably, R4 in Formula (II) may be composed of an aromatic and/or saturated aliphatic moiety consisting of hydrogen atoms and 1-10 carbon atoms.

In Formula (II) n is preferably 1.

More preferably, R4 in Formula (II) may be composed of an aromatic and/or saturated aliphatic moiety consisting of hydrogen atoms and 1-10 carbon atoms and n in Formula (II) is preferably 1.

The functional groups of R3 in Formula (II), —O— or —(CO)—(NH)— or —(CO)—O—, may be so that the comonomer B comprises one or two methacrylate groups or one or two acrylate groups or one or two a methacrylamide groups or one or two acrylamide groups or one or two ether groups or a combination of one of these groups with another one of these groups.

According to a preferred embodiment of the invention the ethylene copolymer comprises $\geq 0.01$ and $\leq 2.00$ mole % of recurring units derived from comonomer B.

Preferably the ethylene copolymer comprises $\leq 1.00$ mole % and more preferably $\leq 0.50$ mole % of recurring units derived from comonomer B, the total mole % of recurring units derived from ethylene, comonomer A and comonomer B adding up to 100%.

More preferably, the ethylene copolymer according to the present invention comprises $\geq 0.05$ and $\leq 10.0$ mol % of recurring units derived from comonomer A and $\geq 0$ and $\leq 1.00$ mole % of recurring units derived from comonomer B, the total mole % of recurring units derived from ethylene, comonomer A and comonomer B adding up to 100%.

More preferably, the ethylene copolymer according to the present invention comprises $\geq 0.05$ and $\leq 10.0$ mol % of recurring units derived from comonomer A and $\geq 0$ and $\leq 1.00$ mole % of recurring units derived from comonomer B, the total mole % of recurring units derived from ethylene, comonomer A and comonomer B adding up to 100%.

Even more preferably the ethylene copolymer according to the present invention comprises $\geq 0.1$ and $\leq 5.0$ mole % of recurring units derived from comonomer A and $\geq 0$ and $\leq 0.50$ mole % of recurring units derived from comonomer B, the total mole % of recurring units derived from ethylene, comonomer A and comonomer B adding up to 100%.

Even more preferably the ethylene copolymer according to the present invention comprises $\geq 0.1$ and $\leq 5.0$ mole % of recurring units derived from comonomer A and $>0$ and $\leq 0.50$ mole % of recurring units derived from comonomer B, the total mole % of recurring units derived from ethylene, comonomer A and comonomer B adding up to 100%.

The presence of these amounts of units derived from comonomer A and comonomer B contributes to the desired combination of low melting temperature and enthalpy of fusion, in combination with a sufficiently low melt mass-flow rate.

In a further preferred embodiment, the invention relates to an ethylene copolymer wherein in Formula (I):

R1 is a moiety selected from the group consisting of:
—[CH$_2$]$_x$—CH$_3$, wherein x$\geq$4;
—[CH$_2$]$_x$—CH(CH$_3$)$_y$—CH$_3$, wherein x$\geq$2 and $\leq$20, and y$\geq$1 and $\leq$10 and —[CH$_2$]$_x$—CH[CH3]$_2$, wherein x≥2 and ≤20.

In another preferred embodiment, the invention relates to an ethylene copolymer wherein in Formula (II):
R4 is a moiety selected from the group consisting of:
—CH$_2$—;
—[CH$_2$]$_x$—CH(CH$_3$)—, wherein x≥1 and ≤10;
—CH$_2$—CH(OH)—CH$_2$— and
—CH$_2$—CHR5-[O—CH$_2$—CHR5]$_q$-, wherein q≥1 and ≤10, and each R5 individually is selected from CH$_3$ and H; and
m≥1 and ≤10

An example of a suitable comonomer A is a compound according to Formula (III):

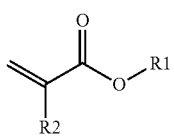

Formula (III)

wherein
R1 is composed of an aromatic and/or saturated aliphatic moiety comprising 5-40 carbon atoms. Preferably, R1 may be composed of an aromatic and/or saturated aliphatic moiety and may only consist of hydrogen atoms and 5-40 carbon atoms.
R2 is selected from —H or —CH$_3$.

Preferably R1 is composed of an aromatic and/or saturated aliphatic moiety comprising 5-12 carbon atoms. Preferably, R1 may be composed of an aromatic and/or saturated aliphatic moiety and may only consist of hydrogen atoms and 5-12 carbon atoms.

More preferably R1 is —[CH$_2$]$_n$—CH$_3$ and n≥4 and ≤20. Preferably R2 is —CH$_3$.

The presence of comonomer A in such quantities contribute to the sealing properties of the ethylene copolymer.

An example of a suitable comonomer B is a compound according to Formula (IV):

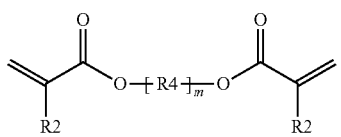

Formula (IV)

wherein
R4 is a moiety selected from the group consisting of:
—CH$_2$—;
—[CH$_2$]$_x$—CH(CH$_3$)—, wherein x≥1 and ≤10;
—CH$_2$—CH(OH)—CH$_2$—;
—CH$_2$—CHR5[O—CH$_2$—CHR5]$_q$, wherein q≥1 and ≤10, and each R5 individually is selected from CH$_3$ and H; and
m≥1 and ≤10; and
each R2 is individually selected from —H or —CH$_3$.
Preferably R2 in Formula (IV) is —CH$_3$.
Preferably m≥2 and ≤5.

The quantity of recurring units derived from ethylene, comonomer A and comonomer B in the ethylene copolymer according to the invention may for example be determined by nucleated magnetic resonance spectroscopy (NMR method) to obtain the $^1$H-NMR and the $^{13}$C-NMR spectra.

Comonomer A may for example be a compound selected from the list consisting of lauryl methacrylate, hexyl methacrylate, 2-ethylhexyl methacrylate, cyclohexyl methacrylate, 10-udecenyl acrylate, behenyl acrylate, stearyl methacrylate, lauryl acrylate, isodecyl acrylate, isooctyl acrylate, octyl acrylate, decyl acrylate, tridecyl acrylate, 3,5,5-trimethylhexyl acrylate, isobornyl methacrylate and/or benzyl methacrylate.

According to a preferred embodiment of the invention comonomer A is lauryl methacrylate, lauryl acrylate, hexyl methacrylate, hexyl acrylate, octyl acrylate, decyl acrylate and/or benzyl methacrylate.

Comonomer B may for example be a compound selected from the list consisting of 1,4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, trimethylol propane trimethacrylate, trimethylol propane triacrylate, 1,4-butanediol divinyl ether, poly(ethylene glycol) divinyl ether, di(ethyleneglycol) divinyl ether, 1,5-hexadiene, 1,7-octadiene, 1,9-decadiene and/or 1,13-tetradecadiene.

According to a preferred embodiment of the invention comonomer B is selected from 1,4-butanediol dimethacrylate, poly(ethylene glycol) dimethacrylate and/or poly(propylene glycol) dimethacrylate.

It is further preferred that the ethylene copolymer obtained by radical polymerisation through a high-pressure process comprises:
(i) ≥88.0 and ≤99.9 mole % of recurring units derived from ethylene;
(ii) ≥0.05 and ≤10.0 mole % of recurring units derived from comonomer A wherein comonomer A is selected from the list consisting of lauryl methacrylate, hexyl methacrylate, 2-ethylhexyl methacrylate, cyclohexyl methacrylate, 10-udecenyl acrylate, behenyl acrylate, stearyl methacrylate, lauryl acrylate, isodecyl acrylate, isooctyl acrylate, octyl acrylate, decyl acrylate, tridecyl acrylate, 3,5,5-trimethylhexyl acrylate, isobornyl methacrylate, benzyl acrylate and/or benzyl methacrylate and
(iii) ≥0 and ≤2.00 mole % or >0 and ≤2.00 mole % of recurring units derived from comonomer B wherein comonomer B is selected from 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate and/or poly(propylene glycol) dimethacrylate wherein the sum of the mole % of (i) (ii) and (iii) is 100 mole %.

More preferably, the ethylene copolymer obtained by radical polymerisation through a high-pressure process comprises
(i) ≥94.0 and ≤99.9 mole % of recurring units derived from ethylene,
(ii) ≥0.10 and ≤5.0 mole % of recurring units derived from comonomer A wherein comonomer A is selected from lauryl methacrylate, lauryl acrylate, hexyl methacrylate, hexyl acrylate, octyl acrylate, decyl acrylate and/or benzyl methacrylate and (iii) ≥0 and ≤1.00 mole % or >0 and ≤1.00 mole % of recurring units derived from comonomer B wherein comonomer B is selected from 1,4-butanediol dimethacrylate, polyethylene glycol) dimethacrylate and poly (propylene glycol) dimethacrylate,
wherein the sum of the mole % of (i), (ii) and (iii) is 100 mole %.

The ethylene copolymer according to the present invention may for example have a melt mass-flow rate as determined in accordance with ISO 1133-1 (2011), at a temperature of 190° C. and a load of 2.16 kg, of ≥0.1 and ≤150.0 g/10 min, more preferably of ≥1.0 and ≤100.0 g/10 min, even more preferably of ≥1.0 and ≤50.0 g/10 min, more preferably ≥1.0 and ≤30.0 g/10 min.

Ethylene copolymers having such melt-mass flow rate are suitable for films, foams, adhesive solutions, wire & cable coatings, seal layers and extrusion coatings.

The ethylene copolymer according to the present invention may for example have a peak melting temperature of ≤110° C., preferably ≤105° C., more preferably ≤100° C. The peak melting temperature is determined in accordance with ISO 11357-3 (2011). Ethylene copolymers having such peak melting temperature are desirable for applications such as extrusion coating or multi-layer films as the energy consumption required to process such polymers via melt processing is desirably low.

The ethylene copolymer according to the invention may for example have enthalpy of fusion of ≤120 J/g, preferably ≤110 J/g, more preferably ≤100 J/g. The enthalpy of fusion is determined in accordance with ISO 11357-3 (2011). Ethylene copolymers having such enthalpy of fusion have a low crystallinity, and a high clarity.

Preferably, the ethylene copolymer according to the present invention has a peak melting temperature as determined according to ISO 11357-3 (2011) of ≤110° C. and a enthalpy of fusion of the melting peak as determined according to ISO 11357-3 (2011) of ≤120 J/g.

Preferably, ethylene copolymers according to the invention are produced in a high-pressure free-radical polymerisation process. An advantage of polymerisation in such high-pressure free-radical process is that the polymerisation may be performed without the need for a catalyst being present. This allows for the use of certain comonomers such as polar comonomers which are not suitable as comonomers in the production of ethylene copolymers via catalytic processes such as using Ziegler-Natta type catalysts because of the interference with such catalyst.

A further advantage of preparation of the ethylene copolymers according to the invention in a high-pressure free-radical polymerisation process is that such polymerisation results in ethylene copolymers having a certain degree of long-chain branching. In order to qualify for certain applications, including extrusion coating application, ethylene copolymers are required to have a certain degree of such long-chain branching. The presence of such long-chain branching is understood to contribute to the desired melt processing properties. Accordingly, it is preferred that the ethylene copolymers according to the present invention are prepared via a high-pressure free-radical polymerisation process. The pressure in such high-pressure free-radical polymerisation process preferably is in the range of ≥180 MPa and ≤350 MPa, preferably ≥200 MPa and ≤300 MPa. The temperature in such high-pressure free-radical polymerisation process preferably is in the range of ≥100 and ≤350° C., preferably ≥150 and ≤310° C., preferably ≥190 and ≤260° C., more preferable ≥200 and ≤250° C.

Such high-pressure free-radical polymerisation process may for example be performed in a tubular reactor. Such tubular reactor may for example be a reactor such as described in Nexant PERP Report 2013-2, 'Low Density Polyethylene', pages 31-48. Such tubular reactor may for example be operated at pressures ranging from 150 to 300 MPa. The tubular reactor may have a tube length of for example ≥1000 m and ≤5000 m. The tubular reactor may for example have a ratio of length to inner diameter of ≥1000:1, alternatively ≥10000:1, alternatively ≥25000:1, such as ≥10000:1 and ≤50000:1, alternatively ≥25000:1 and ≤35000:1. The residence time in the tubular reactor may for example be ≥30 s and ≤300 s, alternatively ≥60 s and ≤200 s. Such tubular reactors may for example have an inner tubular diameter of ≥0.01 m and ≤0.20 m, alternatively ≥0.05 m and ≤0.15 m. The tubular reactor may for example have one or more inlet(s) and one or more outlet(s), The feed composition may for example be fed to the tubular reactor at the inlet of the tubular reactor. The stream that exits the tubular reactor from the outlet may for example comprise the ethylene copolymer. The stream that exits the tubular reactor from the outlet may for example comprise unreacted feed composition. Such unreacted feed compositions may be recycled back into the tubular reactor via one or more inlet.

A further preferred embodiment of the invention relates to a process for production of ethylene copolymers in a tubular reactor wherein:
the process is performed at a pressure of ≥200 and ≤350 MPa, and a temperature of ≥100 and ≤350° C.;
the process is performed in the presence of one or more free-radical initiator selected from organic peroxides and/or azo compounds;
a mixture of reactants is introduced into the reactor comprising:
(a) ≥78.0 and ≤99.9 mole % ethylene;
(b) ≥0.01 and ≤22.0 mole % of comonomer A according to Formula (III):

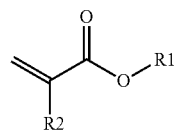

Formula (III)

wherein
R1 is composed of an aromatic and/or saturated aliphatic moiety comprising 5-40 carbon atoms
R2 is selected from —H or —CH$_3$.
(c) ≥0 and ≤2.0 mol % of comonomer B according to Formula (IV):

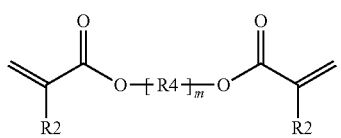

Formula (IV)

wherein
R4 is a moiety selected from the group consisting of:
—CH$_2$—;
—[CH$_2$]$_x$—CH(CH$_3$)—, wherein x≥1 and ≤10;
—CH$_2$—CH(OH)—CH$_2$—;

—CH$_2$—CHR5-[O—CH$_2$—CHR5]$_q$-, wherein q≥1 and ≤10, and each R5 individually is selected from CH$_3$ and H; and n≥1 and ≤10; and each R2 may individually be selected from —H or —CH$_3$ wherein the sum of the mole % of (a), (b) and (c) is 100 mole %.

Preferably, the mixture of reactants comprises:
(a) ≥83.5 and ≤99.45, more preferably ≥94.5 and ≤98.90 mole % ethylene;
(b) ≥0.01 and ≤15.0, more preferably ≥1.0 and ≤5.0, mole % of comonomer A according to Formula (III); and
(c) ≥0 and ≤1.5, more preferably ≥0 and ≤0.5, mole % of comonomer B according to Formula (IV)
wherein the sum of the mole % of (a), (b) and (c) is 100 mole %.

In this process comonomer A acts as comonomer from which aliphatic or aromatic groups are incorporated into the polymer structure of the ethylene copolymer and comonomer B acts as a crosslinking agent.

The use of said comonomers also contributes to a reduction of the formation of waxes, which is desirable from the perspective of stable and continuous operation of the polymerisation process, by reducing the accumulation of such waxes in the process equipment.

It is preferred that in the process for production of the ethylene copolymers according to the present invention comonomer A is selected from lauryl methacrylate, lauryl acrylate, hexyl methacrylate, hexyl acrylate, octyl acrylate, decyl acrylate and/or benzyl methacrylate.

The polymerisation process may for example be performed in the presence of an initiator. Such initiator may for example be an initiator composition comprising one or more selected from organic peroxides or azo compounds.

Suitable organic peroxides may for example include diacyl peroxides, dialkyl peroxides, peroxymonocarbonates, peroxydicarbonates, peroxyketals, peroxyesters, cyclic peroxides, hydroperoxides. Suitable azo compounds may for example include 2,2'-azodi(isobutyronitrile), 2,2'-azodi(2-methylbutyronitrile), 1,1'-azodi(hexahydrobenzonitrile).

Examples of suitable diacyl peroxides are diisobutyryl peroxide, di(3,5,5-trimethylhexanoyl) peroxide, dilauroyl peroxide, didecanoyl peroxide, dibenzoyl peroxide.

Examples of suitable dialkyl peroxides are dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, di-isononanoyl peroxide, di-tert-amyl peroxide, didecanoyl peroxide.

Examples of suitable peroxymonocarbonates are tert-amylperoxy 2-ethylhexyl carbonate, tert-butylperoxy isopropyl carbonate, tert-butylperoxy 2-ethylhexyl carbonate.

Examples of suitable peroxydicarbonates are di(3-methoxybutyl)peroxydicarbonate, di-sec-butyl peroxydicarbonate, diisopropyl peroxydicarbonate, di(4-tert-butylcyclohexyl) peroxydicarbonate, di(2-ethylhexyl) peroxydicarbonate, dibutyl peroxydicarbonate, diacetyl peroxy dicarbonate, dimyristyl peroxydicarbonate, dicyclohexyl peroxydicarbonate.

Examples of suitable peroxyketals are 1,1-di(tert-butyl peroxy)-3,5,5-trimethylcyclohexane, 1,1-di(tert-amyl peroxy)cyclohexane, 1,1-di(tert-butyl peroxy)cyclohexane, 2,2-di(tert-butyl peroxy)butane, butyl 4,4-di(tert-butyl peroxy)valerate, n-ethyl-4,4-di-(tert-butylperoxy)valerate, ethyl-3,3-di(tert-butylperoxy)butyrate, ethyl-3,3-di(tert-amylperoxy)butyrate.

Examples of suitable peroxyesters are cumyl peroxyneodecanoate, 1,1,3,3-tetramethylbutylperoxyneodecanoate, cumyl peroxyneoheptanoate, tert-amyl peroxyneodecanoate, tert-butyl peroxyneodecanoate, tert-butyl peroxyisononanoate, tert-butyl permaleate, tert-butyl peroxydiethylisobutyrate, 1,1,3,3-tetramethylbutyl peroxypivalate, tert-butyl peroxyneoheptanoate, tert-amyl peroxypivalate, tert-butyl peroxypivalate, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, tert-butyl peroxy-2-ethylhexanoate, tert-butyl peroxydiethylacetate, tert-butyl peroxyisobutyrate, tert-amyl peroxyacetate, tert-butyl peroxy-3,5,5-trimethylhexanoate, tert-amyl peroxybenzoate, tert-butyl peroxyacetate, tert-butyl peroxybenzoate.

Examples of suitable cyclic peroxides are 3,6,9-triethyl-3,6,9-trimethyl-1,4,7-triperoxononane, 3,3,5,7,7-pentamethyl-1,2,4-trioxepane, 3,3,6,6,9,9-hexamethyl-1,2,4,5-tetraoxacyclononane.

Examples of suitable hydroperoxides are isopropylcumyl hydroperoxide, 1,1,3,3-tetramethylbutyl hydroperoxide, cumyl hydroperoxide, tert-butyl hydroperoxide, tert-amyl hydroperoxide, methyl isobutyl ketone hydroperoxide, di-isopropyl hydroxyperoxide.

Preferably the free radical initiator composition is selected from 2,5-dimethyl-2,5-di(tert-butylperoxy)hexane, t-butyl peroxy pivalate (t-BPP) and/or t-butyl peroxy benzoate (t-BPB).

Such initiators may for example be fed to the tubular reactor in a pure form or as a solution in a solvent. As solvent, for example a $C_2$-$C_{20}$ normal paraffin or $C_2$-$C_{20}$ isoparaffin may be used. For example, such solution may comprise ≥2.0% and ≤65.0% by weight of initiator, alternatively ≥5.0% and ≤40.0% by weight, alternatively ≥10.0% and ≤30.0% by weight, compared to the total weight of the solution.

Such initiators may for example be introduced into the polymerisation reactor in quantities of ≤300 ppm, preferably ≤200 ppm, compared to the total weight of the materials fed to the polymerisation reactor.

In addition, further modifiers may be fed to the tubular reactor. Examples of such modifiers may include inhibitors, scavengers and/or chain transfer agents, such as alcohols, aldehydes, ketones and aliphatic hydrocarbons. Such modifiers may for example be fed to the tubular reactor in a pure form or as a solution in a solvent.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenyiphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, hydrogen and phosphine.

Preferably, the polymerization is performed in the presence of a chain transfer agent selected from the group consisting of propionaldehyde, n-heptane, propane, isopropanol and acetone.

In a further preferred embodiment, the present invention relates to a process for production of ethylene copolymers in a tubular reactor wherein:
the process is performed at a pressure of ≥200 and ≤350 MPa, and a temperature of ≥100 and ≤350° C.;
the process is performed in the presence of one or more free-radical initiator comprising t-butyl peroxy pivalate;
a mixture of reactants is introduced into the reactor comprising:
(a) ≥78.0 and ≤99.9 mole % ethylene;
(b) ≥0.01 and ≤22.0 mole % of comonomer A selected from lauryl methacrylate, lauryl acrylate, hexyl methacrylate, hexyl acrylate, octyl acrylate, decyl acrylate and/or benzyl methacrylate.
(c) ≥0 and ≤2.0 mole % of comonomer B selected from 1,4-butanediol dimethacrylate, poly(ethylene glycol) dimethacrylate and poly(propylene glycol dimethacrylate);
wherein the sum of the mole % of (a), (b) and (c) is 100 mole %.
wherein further a quantity of a chain transfer agent selected from the group consisting of propionaldehyde, n-heptane, propane, isopropanol and acetone is fed to the tubular reactor.

The quantity of the chain transfer agent is preferably in the range between 0.01 and 2 mole % relative to the mixture of reactants.

In a further preferred embodiment, the present invention relates to a process for production of ethylene copolymers in a tubular reactor wherein:
the process is performed at a pressure of ≥200 and ≤350 MPa, and a temperature of ≥100 and ≤350° C.;
the process is performed in the presence of one or more free-radical initiator selected from organic peroxides and/or azo compounds;
a mixture of reactants is introduced into the reactor comprising:
(a) ≥93.0 and ≤99.9 mole % ethylene;
(b) ≥0.01 and ≤5.0 mole % of a comonomer A according to Formula (III):

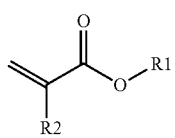

Formula (III)

wherein
R1 is composed of an aromatic and/or saturated aliphatic moiety comprising 5-40 carbon atoms and
R2 is selected from —H or —CH$_3$.
and (c) ≥0 and ≤2.0 mole % of a comonomer B according to Formula (IV):

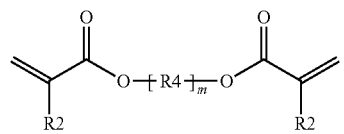

Formula (IV)

wherein
R4 is a moiety selected from the group consisting of:
—CH$_2$—;
—[CH$_2$]$_x$—CH(CH$_3$)—, wherein x≥1 and ≤10;
—CH$_2$—CH(OH)—CH$_2$—;
—CH$_2$—CHR5-[O—CH$_2$—CHR5]$_q$-, wherein q≥1 and ≤10, and each R5 individually is selected from CH$_3$ and H; and
m≥1 and ≤10; and
each R2 is individually selected from —H or —CH$_3$
wherein the sum of the mole % of (a), (b) and (c) is 100 mole %.

In a further preferred embodiment, the present invention relates to a process for production of ethylene copolymers in a tubular reactor wherein:
the process is performed at a pressure of ≥200 and ≤350 MPa, and a temperature of ≥100 and ≤350° C.;
the process is performed in the presence of one or more free-radical initiator selected from organic peroxides and/or azo compounds;
a mixture of reactants is introduced into the reactor comprising:
(a) ≥93.0 and ≤99.9 mole % ethylene;
(b) ≥0.01 and ≤5.0 mole % of a comonomer A according to Formula (III):

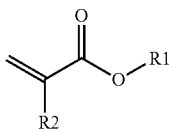

Formula (III)

wherein
R1 is composed of an aromatic and/or saturated aliphatic moiety and consists of hydrogen atoms and 5-40 carbon atoms
and
R$_2$ is selected from —H or —CH$_3$.
and
(c) >0 and ≤2.0 mole % of a comonomer B according to Formula (IV):

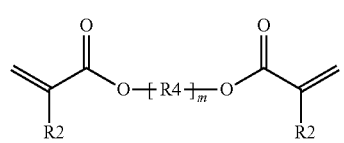

Formula (IV)

wherein
R4 is a moiety selected from the group consisting of:
—CH$_2$—;
—[CH$_2$]$_x$—CH(CH$_3$)—, wherein x≥1 and ≤10;

—$CH_2$—$CH(OH)$—$CH_2$—;
—$CH_2$—$CHR5$-[O—$CH_2$—$CHR5]_q$-, wherein q≥1 and ≤10, and each R5 individually is selected from $CH_3$ and H; and
m≥1 and ≤10; and
each R2 is individually selected from —H or —$CH_3$
wherein the sum of the mole % of (a), (b) and (c) is 100 mole %.

The invention further relates to the use of an ethylene copolymer according to the invention or produced according to the invention in the production of extrusion coated articles, films, foams, adhesives, bitumen modifiers, moulded articles, 3D printed articles and/or polymer alloys. Also, the invention relates to articles comprising an ethylene copolymer according to the invention or produced according to the process according to the invention wherein the article is an extrusion coated article, a film, a foam, an adhesive, a bitumen modifier, a moulded article, a 3D printed article or a polymer alloy.

The invention will now be illustrated by the following non-limiting examples.

EXAMPLES

The materials listed below were used as comonomers in the examples.

| | |
|---|---|
| BDDMA | 1,4-butanediol dimethacrylate, CAS registry nr. 2082-81-7 |
| LaurylMA | Lauryl methacrylate, CAS registry nr. 142-90-5 |
| BenzylMA | Benzyl methacrylate, CAS registry nr. 2495-37-6 |
| IsobornylMA | Isobornyl methacrylate, CAS registry nr. 7534-94-3 |
| HEMA | (Hydroxyethyl)methacrylate, CAS registry nr. 868-77-9 |

Examples 1-8 and Comparative Example A-C

Preparation of Ethylene Copolymers

In a high-pressure stirred autoclave polymerisation reactor, ethylene copolymers were prepared by reacting a feed mixture comprising ethylene and an amount of comonomer as presented in Table I. In addition, a quantity of 1.45 mole % of isopropanol with regard to the molar quantity of ethylene was fed. In examples 5-8, a further quantity of 0.058 mole % propionaldehyde with regard to the molar quantity of ethylene was fed.

The reaction was performed at a pressure of 200 MPa. The reaction was initiated by addition of 4.0 g/l solution of t-butyl peroxy pivalate (t-BPP) in heptane, in quantities as indicated in Table I. t-BPP was fed in such quantity as to reach the desired temperature. The reaction temperature was kept at the temperature in ° C. as indicated in Table I. The average residence time in all examples was 45 s. The obtained ethylene polymer was collected.

TABLE I

| Example | Comonomer A (mole %) | Comonomer B (mole %) | t-BPP (mole %) | Temperature (° C.) |
|---|---|---|---|---|
| 1 | 0.20 LaurylMA | | 0.0007 | 220 |
| 2 | 0.40 LaurylMA | | 0.0006 | 200 |
| 3 | 0.40 LaurylMA | | 0.0006 | 220 |
| 4 | 0.10 BenzylMA | | 0.0002 | 220 |
| 5 | 0.20 BenzylMA | | 0.0004 | 220 |
| 6 | 0.20 IsobornylMA | | 0.0005 | 220 |
| 7 | 0.40 LaurylMA | 0.02 BDDMA | 0.0007 | 200 |
| 8 | 0.40 LaurylMA | 0.02 BDDMA | 0.0017 | 220 |
| A | No comonomer | | 0.0004 | 220 |
| B | 1.2 HEMA | | 0.0036 | 220 |
| C | 0.2 HEMA | | 0.00068 | 220 |

The mole % relate to the amount of ethylene, comonomer A, comonomer B, t-BPP, heptane and of isopropanol, wherein sum thereof yield in 100 mole %.

1.45 mole % of isopropanol is used as a solvent for the comonomer and 0.32 mole % of heptane is used as solvent for the t-BPP.

Properties of the Ethylene Copolymers Examples 1-8 and Comparative Examples A-C.

For each of the ethylene copolymers that were prepared using the feed mixtures and polymerisation conditions as presented in Table I, the material properties were determined as presented in Table II.

TABLE II

| Example | Comonomer A (mole %) | Comonomer B (mole %) | MFR (g/10 min) | Tm (° C.) | $\Delta H_F$ (J/g) |
|---|---|---|---|---|---|
| 1 | 1.6 | | 11.8 | 99 | 77 |
| 2 | 3.3 | | 10.9 | 101 | 89 |
| 3 | 3.0 | | 43.0 | 101 | 87 |
| 4 | 0.5 | | 0.50 | 111 | 138 |
| 5 | 0.8 | | 10.0 | 78 | 47 |
| 6 | 1.4 | | 17.0 | 106 | 119 |
| 7 | 3.2 | 0.2 | 3.96 | 99 | 78 |
| 8 | 3.0 | 0.2 | 38.1 | 107 | 109 |
| A | No comonomer | | 14.5 | 114 | 150 |
| B | 7.9 | | 321 | 108 | 116 |
| C | 1.3 | | 6.7 | 112 | 139 | wherein:

The content of recurring units derived from comonomer A and from comonomer B is determined via NMR, wherein the sample is dissolved in deuterated tetrachloroethane at 120° C. The NMR spectra are recorded with a Bruker Avance 500 NMR spectrometer equipped with a 10 mm diameter cryo-cooled probe head, operating at 125° C., to obtain both $^1$H-NMR and $^{13}$C-NMR spectra, measuring time $^{13}$C-NMR 3 hrs, $^1$H-NMR 30 min.

Com. A: The quantity of recurring units derived from comonomer A in mole %, as determined via NMR according to the method presented above;

Com. B: The quantity of recurring units derived from comonomer B in mole %, as determined via NMR according to the method presented above;

The quantity of recurring units derived from ethylene in mole %, as determined via NMR according to the method presented above;

The quantities of recurring units derived from comonomer A, comonomer B and ethylene are expressed as molar fraction of the sum of units derived from comonomer A, comonomer B and ethylene, the total adding up to 100 mole %.

MFR: Melt mass-flow rate in g/10 min as determined in accordance with ISO 1133-1 (2011), at 190° C. under a load of 2.16 kg.

$T_m$ is the peak melting temperature in ° C. as determined via differential scanning calorimetry (DSC) according to ISO 11357-3 (2011) using a NETZSCH DSC 200PC differential scanning calorimeter.

$\Delta H_F$ is the enthalpy of fusion of the melting peak in J/g as determined according to ISO 11357-3 (2011) using a NETZSCH DSC 200PC differential scanning calorimeter.

The examples show that ethylene copolymers according to the present invention have a reduced peak melting temperature and reduced enthalpy of fusion, indicating that these ethylene copolymers have a reduced degree of crystallinity combined with a desired melt mass-flow rate.

Comparative sample B shows that a similar peak melting temperature and a similar enthalpy of fusion as compared to the inventive samples 1-8 is only obtained at a higher comonomer dosage and a higher mol % of incorporation.

Comparative sample C shows that at a similar comonomer dosage and a similar mol % of incorporation as compared to the inventive samples 1-8 a higher peak melting temperature and a higher enthalpy of fusion is obtained.

Especially comonomer B allows to reduce the MFI. Thereby the MFI can be controlled and the desired MFI is obtained. This is demonstrated by sample 7 in comparison to sample 2 and sample 8 in comparison to sample 3.

The invention claimed is:

1. Ethylene copolymer obtained by radical polymerisation through a high-pressure process comprising:
   (i) ≥78.0 and ≤99.99 mole % of recurring units derived from ethylene;
   (ii) ≥0.01 and ≤22.0 mole % of recurring units derived from comonomer A according to Formula (I):

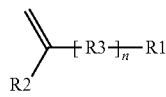

Formula (I)

wherein
R1 is composed of a saturated aliphatic moiety comprising 5-40 carbon atoms or R1 is composed of a saturated aliphatic moiety and consists of hydrogen atoms and 5-40 carbon atoms;
R2 is —H or —CH3;
R3 is —O—, —(CO)—(NH)— or —(CO)—O—; and
n=0 or 1,
wherein the ethylene copolymer has a melt mass-flow rate as determined in accordance with ISO 1133-1 (2011), at a temperature of 190° C. and a load of 2.16 kg, of ≥0.1 and ≤150.0 g/10 min.

2. Ethylene copolymer according to claim 1 wherein the ethylene copolymer comprises
   (iii) ≥0 and ≤2.00 mole % of recurring units derived from comonomer B according to Formula (II):

Formula (II)

wherein
R4 is a moiety comprising 1-30 carbon atoms;
each of R2 is independently —H or —CH3;
each of R3 is independently —O—, —(CO)—(NH)— or —(CO)—O—;
n=0 or 1;
p=0 or 1; and
m≥1 and ≤10.

3. Ethylene copolymer according to claim 2 wherein the copolymer comprises
   ≥78.0 and ≤99.99 mole % of recurring units derived from ethylene;
   ≥0.01 and ≤22.0 mole % of recurring units derived from comonomer A wherein comonomer A is selected from the group consisting of lauryl methacrylate, hexyl methacrylate, 2-ethylhexyl methacrylate, cyclohexyl methacrylate, 10-undecenyl acrylate, behenyl acrylate, stearyl methacrylate, lauryl acrylate, isodecyl acrylate, isooctyl acrylate, octyl acrylate, tridecyl acrylate, 3,5,5-trimethylhexyl acrylate and isobornyl methacrylate and
   ≥0 and ≤2.00 mole % of recurring units derived from comonomer B wherein comonomer B is 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, or poly(propylene glycol) dimethacrylate.

4. Ethylene copolymer according to claim 1 wherein comonomer A is a compound according to Formula (III):

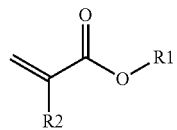

Formula (III)

wherein
R1 is composed of a saturated aliphatic moiety comprising 5-40 carbon atoms or R1 is composed of a saturated aliphatic moiety consisting of hydrogen atoms and 5-40 carbon atoms,
R2 is —H or —CH3.

5. Ethylene copolymer according to claim 1 wherein R1 is composed of a saturated aliphatic moiety comprising 5-12 carbon atoms or wherein R1 is composed of a saturated aliphatic moiety and consists of hydrogen atoms and 5-12 carbon atoms.

6. Ethylene copolymer according to claim 1 wherein the ethylene copolymer is produced in a tubular reactor.

7. Article comprising an ethylene copolymer according to claim 1 wherein the article is an extrusion coated article, a film, a foam, an adhesive, a bitumen modifier, a moulded article, a 3D printed article or a polymer alloy.

8. Ethylene copolymer obtained by radical polymerisation through a high-pressure process comprising:
   ≥78.0 and ≤99.99 mole % of recurring units derived from ethylene;
   iii) ≥0.01 and ≤22.0 mole % of recurring units derived from comonomer A according to Formula (I):

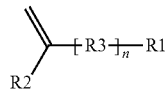

Formula (I)

wherein
R1 is composed of a saturated aliphatic moiety comprising 5-40 carbon atoms or R1 is composed of a saturated aliphatic moiety and consists of hydrogen atoms and 5-40 carbon atoms;

R2 is —H or —CH3;
R3 is —O—, —(CO)—(NH)— or —(CO)—O—; and
n=0 or 1,
wherein the ethylene copolymer further comprises
(iii) >0 and ≤2.00 mole % of recurring units derived from comonomer B according to Formula (II):

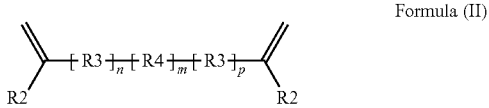

Formula (II)

wherein
R4 is a moiety comprising 1-30 carbon atoms;
each of R2 is independently —H or —CH3;
each of R3 is independently —O—, —(CO)—(NH)— or —(CO)—O—;
n=0 or 1;
p=0 or 1; and
m≥1 and ≤10.

9. Ethylene copolymer according to claim 8 wherein the comonomer B is a compound according to Formula (IV):

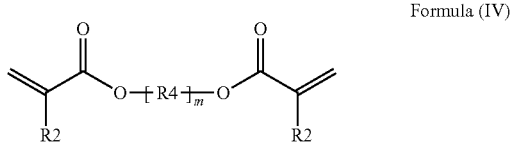

Formula (IV)

wherein
R4 is a moiety selected from the group consisting of:
—CH2—;
—[CH2]x-CH(CH3)—, wherein x≥1 and ≤10;
—CH2—CH(OH)—CH2—; and
—CH2—CHR5—[—CH2—CHR5]q-, wherein q≥1 and ≤10, and each R5 individually is selected from CH3 and H; and
m≥1 and ≤10 and
each R2 is independently —H or —CH3.

10. Ethylene copolymer according to claim 8 wherein comonomer A is a compound selected from the group consisting of lauryl methacrylate, hexyl methacrylate, 2-ethylhexyl methacrylate, cyclohexyl methacrylate, 10-undecenyl acrylate, behenyl acrylate, stearyl methacrylate, lauryl acrylate, isodecyl acrylate, isooctyl acrylate, octyl acrylate, tridecyl acrylate, 3,5,5-trimethylhexyl acrylate and isobornyl methacrylate and/or
comonomer B is a compound selected from the group consisting of 1,4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, trimethylol propane trimethacrylate, trimethylol propane triacrylate, 1,4-butanediol divinyl ether, poly(ethylene glycol) divinyl ether, di(ethyleneglycol) divinyl ether, 1,5-hexadiene, 1,7-octadiene, 1,9-decadiene and 1,13-tetradecadiene.

11. Ethylene copolymer according to claim 8 wherein the ethylene copolymer has a melt mass-flow rate as determined in accordance with ISO 1133-1 (2011), at a temperature of 190° C. and a load of 2.16 kg, of ≥0.1 and ≤150.0 g/10 min.

12. Ethylene copolymer according to claim 8, wherein the copolymer comprises
≥78.0 and ≤99.99 mole % of recurring units derived from ethylene;
≥0.01 and ≤22.0 mole % of recurring units derived from comonomer A wherein comonomer A is selected from the group consisting of lauryl methacrylate, hexyl methacrylate, 2-ethylhexyl methacrylate, cyclohexyl methacrylate, 10-undecenyl acrylate, behenyl acrylate, stearyl methacrylate, lauryl acrylate, isodecyl acrylate, isooctyl acrylate, octyl acrylate, tridecyl acrylate, 3,5,5-trimethylhexyl acrylate and isobornyl methacrylate and
≥0 and ≤2.00 mole % of recurring units derived from comonomer B wherein comonomer B is 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, or poly(propylene glycol) dimethacrylate.

13. Article comprising an ethylene copolymer according to claim 8 wherein the article is an extrusion coated article, a film, a foam, an adhesive, a bitumen modifier, a moulded article, a 3D printed article or a polymer alloy.

14. Ethylene copolymer obtained by radical polymerisation through a high-pressure process comprising:
(i) ≥78.0 and ≤99.99 mole % of recurring units derived from ethylene;
(ii) ≥0.01 and ≤22.0 mole % of recurring units derived from comonomer A according to Formula (I):

Formula (I)

wherein
R1 is composed of a saturated aliphatic moiety comprising 5-40 carbon atoms or R1 is composed of a saturated aliphatic moiety and consists of hydrogen atoms and 5-40 carbon atoms;
R2 is —H or —CH3;
R3 is —O—, —(CO)—(NH)— or —(CO)—O—; and
n=0 or 1,
wherein the ethylene copolymer has a peak melting temperature as determined according to ISO 11357-3 (2011) of ≤110° C. and an enthalpy of fusion of the melting peak as determined according to ISO 11357-3 (2011) of ≤120 J/g.

15. Ethylene copolymer according to claim 14, wherein the copolymer comprises
≥78.0 and ≤99.99 mole % of recurring units derived from ethylene;
≥0.01 and ≤22.0 mole % of recurring units derived from comonomer A wherein comonomer A is selected from the group consisting of lauryl methacrylate, hexyl methacrylate, 2-ethylhexyl methacrylate, cyclohexyl methacrylate, 10-undecenyl acrylate, behenyl acrylate, stearyl methacrylate, lauryl acrylate, isodecyl acrylate, isooctyl acrylate, octyl acrylate, tridecyl acrylate, 3,5,5-trimethylhexyl acrylate and isobornyl methacrylate and ≥0 and ≤2.00 mole % of recurring units derived from comonomer B wherein comonomer B is 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, or poly(propylene glycol) dimethacrylate.

16. Article comprising an ethylene copolymer according to claim 14 wherein the article is an extrusion coated article, a film, a foam, an adhesive, a bitumen modifier, a moulded article, a 3D printed article or a polymer alloy.

17. Process for production of ethylene copolymers according to claim 2 in a tubular reactor, wherein:
   the process is performed at a pressure of ≥200 and ≤350 MPa, and a temperature of ≥100 and ≤350° C.;
   the process is performed in the presence of one or more free-radical initiator selected from organic peroxides and/or azo compounds;
   a mixture of reactants is introduced into the reactor comprising:
   (a) ≥78.0 and ≤99.99 mole % ethylene;
   (b) ≥0.01 and ≤22.0 mole % of a comonomer A according to Formula (III):

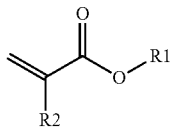

Formula (III)

wherein
R1 is composed of a saturated aliphatic moiety comprising 5-40 carbon atoms
R2 is —H or —CH3; and
(c) ≥0 and ≤2.0 mole % of a comonomer B according to Formula (IV):

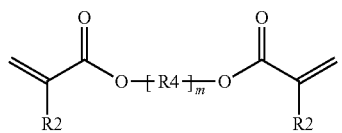

Formula (IV)

wherein
R4 is a moiety selected from the group consisting of:
—CH2—;
—[CH2]x-CH(CH3)—, wherein x≥1 and ≤10;
—CH2—CH(OH)—CH2—; and
—CH2—CHR5—[O—CH2—CHR5]q-, wherein q≥1 and ≤10, and each R5 individually is selected from CH3 and H; and
m≥1 and ≤10; and
each R2 is independently —H or —CH3.

18. Process according to claim 17 wherein
comonomer A is selected from lauryl methcrylate, lauryl acrylate, hexyl methacrylate, hexyl acrylate, octyl acrylate and decyl acrylate and
comonomer B is selected from 1,4-butanediol dimethacrylate, poly(ethylene glycol) dimethacrylate and poly(propylene glycol dimethacrylate).

* * * * *